US007073922B2

(12) United States Patent
Monjo et al.

(10) Patent No.: US 7,073,922 B2
(45) Date of Patent: Jul. 11, 2006

(54) LIGHTING FIXTURE

(75) Inventors: Yoshio Monjo, Myozai-gun (JP); Tomoaki Inuzuka, Anan (JP)

(73) Assignees: Daisho Denki Inc., Tokushima (JP); Nichia Corporation, Tokushima (JP)

( * ) Notice: Subject to any disclaimer, the term of this patent is extended or adjusted under 35 U.S.C. 154(b) by 58 days.

(21) Appl. No.: 10/503,987

(22) PCT Filed: Feb. 10, 2003

(86) PCT No.: PCT/JP03/01406

§ 371 (c)(1), (2), (4) Date: Aug. 10, 2004

(87) PCT Pub. No.: WO03/069219

PCT Pub. Date: Aug. 21, 2003

(65) Prior Publication Data

US 2005/0063185 A1 Mar. 24, 2005

(30) Foreign Application Priority Data

Feb. 12, 2002 (JP) ............................ 2002-034130

(51) Int. Cl.
*B60Q 1/26* (2006.01)

(52) U.S. Cl. ...................... 362/232; 362/271; 362/280; 362/285; 362/800

(58) Field of Classification Search ................ 362/232, 362/277, 285, 319, 800, 230, 231, 235, 249, 362/250, 341, 347, 418, 276, 240, 247, 545, 362/519

See application file for complete search history.

(56) References Cited

U.S. PATENT DOCUMENTS

| | | | | |
|---|---|---|---|---|
| 3,767,903 | A * | 10/1973 | Dean, III | 362/232 |
| 4,893,223 | A * | 1/1990 | Arnold | 362/252 |
| 4,988,183 | A * | 1/1991 | Kasahara et al. | 351/210 |
| 5,038,258 | A * | 8/1991 | Koch et al. | 362/237 |
| 5,309,277 | A * | 5/1994 | Deck | 359/387 |
| 5,580,163 | A * | 12/1996 | Johnson, II | 362/285 |
| 5,690,417 | A * | 11/1997 | Polidor et al. | 362/244 |
| 5,752,766 | A * | 5/1998 | Bailey et al. | 362/250 |
| 6,179,439 | B1 * | 1/2001 | Choate | 362/247 |
| 6,585,395 | B1 * | 7/2003 | Luk | 362/250 |
| 6,939,027 | B1 * | 9/2005 | Harumoto | 362/336 |
| 2003/0107887 | A1 * | 6/2003 | Eberl | 362/227 |

FOREIGN PATENT DOCUMENTS

| | | |
|---|---|---|
| JP | 10-83709 | 3/1998 |
| JP | 10-302514 | 11/1998 |
| JP | 2002-82304 | 3/2000 |
| JP | 2002-8410 | 1/2002 |

* cited by examiner

*Primary Examiner*—John Anthony Ward
*Assistant Examiner*—Gunyoung T. Lee
(74) *Attorney, Agent, or Firm*—Wenderoth, Lind & Ponack, L.L.P.

(57) ABSTRACT

A lighting apparatus includes a plurality of light-emitting diodes emitting red, blue, and green light. The plurality of light-emitting diodes emit light beams and are arranged so as to emit the light beams toward a focusing point. A control circuit is provided for controlling the intensity of light emission of each of the light-emitting diodes emitting red, blue, and green light. A concave reflector is provided for reflecting and radiating the light focused from the light-emitting diodes to the focusing point so that the light is further focused or scattered. The apparatus also has a position-changing mechanism for changing a relative position of the concave reflector relative to the focusing point of the light-emitting diodes.

20 Claims, 7 Drawing Sheets

LIGHTING FIXTURE

BACKGROUND OF THE INVENTION

1. Technical Filed

The present invention relates to a lighting apparatus, which is the most suitable for use mainly in a studio such as a TV studio.

2. Description of Related Art

Conventional lighting apparatuses used in a studio such as a TV studio employ a halogen lamp or a xenon lamp called HID. The halogen lamp has a feature that a color temperature can be high in high efficiency as a filament heating type light source. Particularly, the halogen lamp has a feature that can vary the color temperature by controlling voltage or current so as to adjust a filament temperature. However, the halogen lamp has a disadvantage that its lifetime is short. In particular, if the filament temperature is high so as to achieve a high color temperature, its lifetime tends to be sharply shortened. On the other hand, the xenon lamp has the feature that its lifetime can be long even if its color temperature is higher than in the case of the halogen lamp. But, since the xenon lamp cannot adjust the intensity of its light emission or its color temperature extensively, it has the disadvantage that the intensity of the light emission and the color temperature are constant.

Besides, neither the halogen lamp nor the xenon lamp can quickly vary the intensity of their light emission. Since the halogen lamp changes the light emission or the color of light emission by varying the filament temperature, there is a considerable delay in adjustment. The xenon lamp has another disadvantage in that it takes a considerable period of time for restarting of the xenon lamp after turned off. Accordingly, the halogen lamp and the xenon lamp have a disadvantage that they cannot be used in the case of the applications where it is necessary to quickly change intensity of light emission or color of light emission.

Therefore, the present invention has been developed to solve the above disadvantages. It is an important object of the present invention to provide a lighting apparatus capable of varying both a color temperature and an intensity of light emission extensively.

It is another significant object of the present invention to provide a lighting apparatus capable of varying both a color temperature and an intensity of light emission very quickly.

It is another significant object of the present invention to provide a lighting apparatus capable of maintaining a chromaticity coordinates (color temperature) specified once.

It is another significant object of the present invention to provide a lighting apparatus capable of focusing the illumination range to a very narrow spot or of scattering the light radiation over a wide range.

It is still another significant object of the present invention is to provide a lighting apparatus with a long lifetime and capable of achieving simple maintenance and control.

SUMMARY OF THE INVENTION

A lighting apparatus according to the present invention comprises a plurality of light-emitting diodes emitting red, blue, and green light, the plurality of light-emitting diodes emitting light beams and being arranged so as to emit the light beams toward a focusing point; a control circuit for controlling intensity of light emission of each of the light-emitting diodes emitting red, blue, and green light; a concave reflector reflecting and radiating the light focused from the light-emitting diodes to the focusing point so that the light is further focused or scattered; and a position-changing mechanism for changing a relative position of the concave reflector relative to the focusing point of the light-emitting diodes. In the lighting apparatus, the position-changing mechanism changes a relative position of the focusing point of the plurality of the light-emitting diodes relative to a focal point of the concave reflector so that the light beams from the light-emitting diodes are focused or scattered by the concave reflector.

A lighting apparatus according to the present invention may comprise a plurality of light-emitting diodes emitting red, blue, and green light. The light-emitting diodes are operable to emit light beams and are arranged so as to emit the light beams toward a focusing point. A control circuit is provided for controlling the intensity of the light emission of each of the light-emitting diodes emitting red, blue, and green light.

A convex reflector reflects the light focused from the light-emitting diodes, and a concave reflector reflects and radiates the light from the light-emitting diodes that are reflected by the convex reflector so that the light is focused or scattered. Also, a position-changing mechanism changes a relative position of the concave reflector relative to the convex reflector or a relative position of the light-emitting diodes relative to the convex reflector. This lighting apparatus focuses the light beams from the light-emitting diodes by changing the relative position of the convex reflector relative to the concave reflector or the relative position of the light-emitting diodes relative to the convex reflector by the position-changing mechanism.

In the lighting apparatus according to the present invention, when the focusing point of the light-emitting diodes may be positioned at the focal point of the concave reflector, the concave reflector reflects the light beams from the light-emitting diodes so as to focus the light beams.

Further, in the lighting apparatus according to the present invention, the concave reflector may be disposed so that its lower surface serves as a reflection surface, and the light-emitting diodes may be arranged so as to upwardly emit the light beams from the lower side of the concave reflector.

Further, in the lighting apparatus according to the present invention, a conical reflector horn, an inner surface of which reflects the light emitted from the light-emitting diodes so as to focus the light to its tip portion, may be disposed between the light-emitting diodes and the concave reflector, and the conical reflector horn focuses the light emitted from the plurality of light-emitting diodes to the focusing point.

In the lighting apparatus with the convex reflector, the convex reflector may be disposed adjacent to the focal point of the concave reflector, and the convex reflector reflects the light beams from the light-emitting diodes so that the concave reflector reflects the light beams.

Further, in the lighting apparatus with the convex reflector, the convex reflector may be disposed adjacent to the focal point of the concave reflector, and the concave reflector may have a center hole opening therein, and the light beams from the light-emitting diodes pass through the center hole in the concave reflector, and the convex reflector reflects light beams so that the concave reflector reflects the light beams. In this lighting apparatus, a conical reflector horn, an inner surface of which reflects the light emitted from the light-emitting diodes so as to focus the light to its tip portion, may be disposed between the light-emitting diodes and the convex reflector, and the conical reflector horn focuses the light emitted from the plurality of light-emitting diodes so that the convex reflector reflects the light.

The control circuit may control the intensities of light emissions of the light-emitting diodes emitting red, blue, and green light so that a color temperature of the light emission is varied.

DETAILED DESCRIPTION OF THE INVENTION

Figure 1:
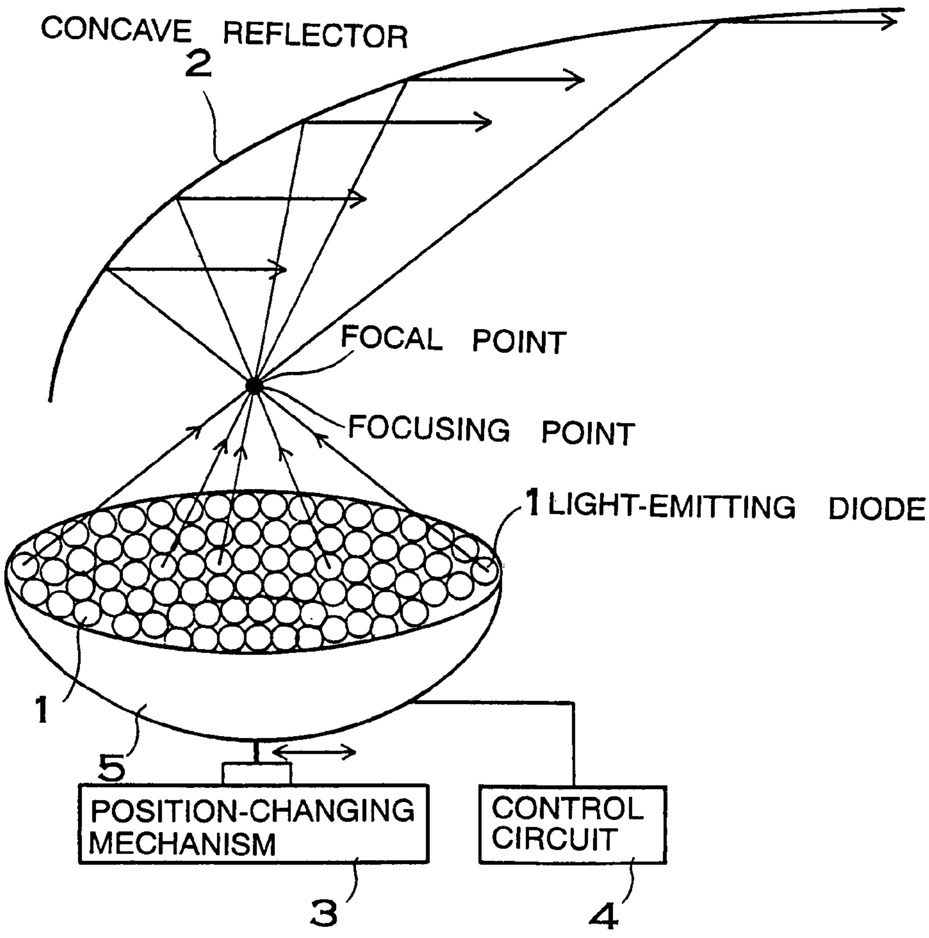
FIG. 1 is a view schematically showing the construction of a lighting apparatus according to one embodiment of the present invention.

As shown in FIG. 1 to FIG. 4, the lighting apparatus includes a plurality of light-emitting diodes 1 (21, 31, 41), a concave reflector 2 (22, 32, 42), which further focuses or scatters light beams from the light-emitting diodes 1 (21, 31, 41), a position-changing mechanism 3 (23, 33, 43) for changing a relative position of the light-emitting diodes 1 (21, 31, 41) relative to the concave reflector 2 (22, 32, 42), and a control circuit 4 (24, 34, 44) for changing the color of the whole light emissions of the light-emitting diodes 1 (21, 31, 41).

The plurality of light-emitting diodes 1 (21, 31, 41) have focusing lenses for radiating the focused light beams, and are arranged and fixed on a base 5 (25, 35, 45) so as to radiate the light beams toward a focusing point. The light-emitting diodes 1 (21, 31, 41) include a plurality of red light-emitting diodes, a plurality of blue light-emitting diodes, and a plurality of green light-emitting diodes. The light-emitting diodes 1 (21, 31, 41) emitting red, blue, and green light are fixed on the base 5 (25, 35, 45). The light-emitting diodes 1 (21, 31,41) emitting red, blue, and green light are arranged on the base 5 (25, 35, 45), which has a spherical shape so that the light beams are focused to the focusing point. The light beams from the respective light-emitting diodes 1 (21, 31, 41) are directed to the focusing point at the center of the sphere. The numbers of the red light-emitting diodes, blue light-emitting diodes, and green light-emitting diodes can be specified so that the emitted light exhibits white color in the state where rated currents are entirely supplied. The light-emitting diodes 1 (21, 31, 41) emitting red, blue, and green light do not always emit the light in the same luminance, therefore, the number of light-emitting diodes emitting the light in higher luminance may be fewer than the number of light-emitting diodes emitting the light in lower luminance.

The control circuit 4 (24, 34, 44) controls the intensity of light emission of each of the light-emitting diodes 1 (21, 31, 41) emitting red, blue, and green light so as to adjust color of the whole light emissions and color temperature. The light-emitting diodes 1 (21, 31, 41) vary the intensity of light depending on the currents flowing therein. Therefore, the control circuit 4 (24, 34, 44) controls the ratio of currents flowing in the light-emitting diodes 1 (21, 31, 41) emitting red, blue, and green light so as to adjust the color of the whole light emissions and the color temperature of the lighting apparatus. The control circuit 4 further controls the amounts of currents flowing in the light-emitting diodes 1 (21, 31, 41) emitting red, blue, and green light so as to adjust the luminance of the lighting apparatus.

Figure 2:
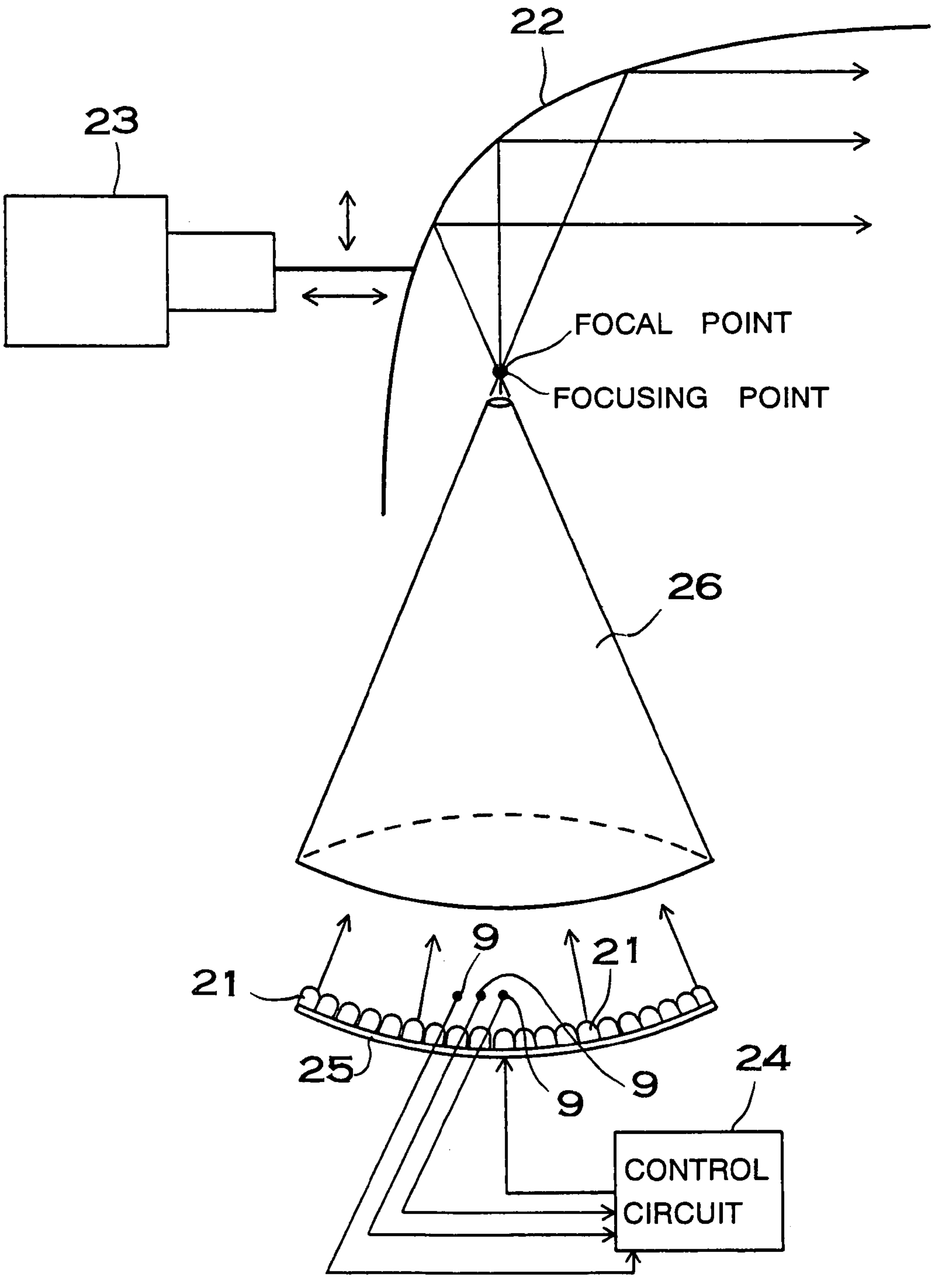
FIG. 2 is a view schematically showing the construction of a lighting apparatus according to another embodiment of the present invention.

In addition, as shown in FIG. 2, photo sensors 9 capable of detecting the intensity of light of wavelengths corresponding to red, blue, and green can be located at positions where the they can detect the light from the light-emitting diodes 21 emitting red, blue, and green light, and can be connected to the control circuit 24. In the lighting apparatus shown in FIG. 2, the photo sensors 9 are located at the positions where they can directly detect the light from the light-emitting diodes 21, however, the photo sensors may be located at the positions where they can indirectly detect light from the light-emitting diodes. In this lighting apparatus, the photo sensors 9 detect the intensity of light of wavelengths corresponding to red, blue, and green emitted from the light-emitting diode 21, thus, the control circuit 24 can control the electric power supplied to the light-emitting diodes 21 so that the intensity of light of wavelengths corresponding to red, blue, and green are always constant. Additionally, the control circuit 24 can also control the electric power supplied to the light-emitting diodes 21 so that the ratio of intensities of light emissions of wavelengths corresponding to red, blue, and green is constant. The electric power supplied to the light-emitting diodes can be controlled by the supplied currents.

Figure 6:
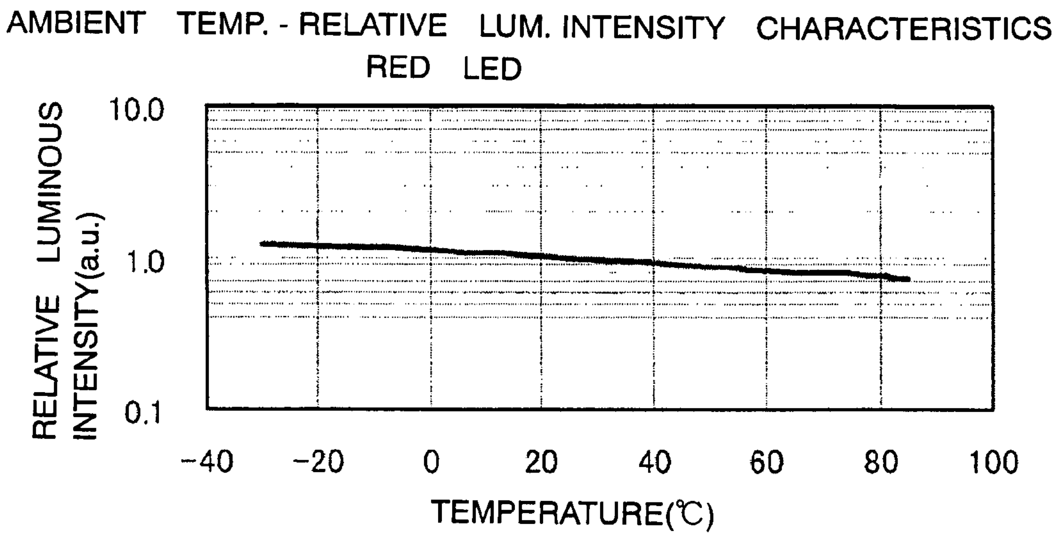
FIG. 6 is a graph showing temperature characteristics of a red light-emitting diode.
Figure 7:
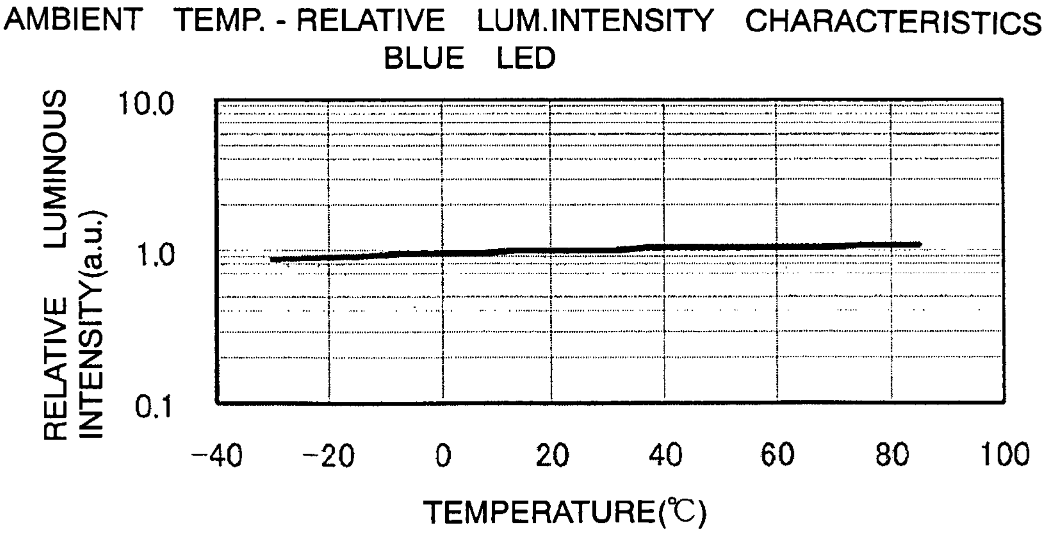
FIG. 7 is a graph showing temperature characteristics of a blue light-emitting diode.
Figure 8:
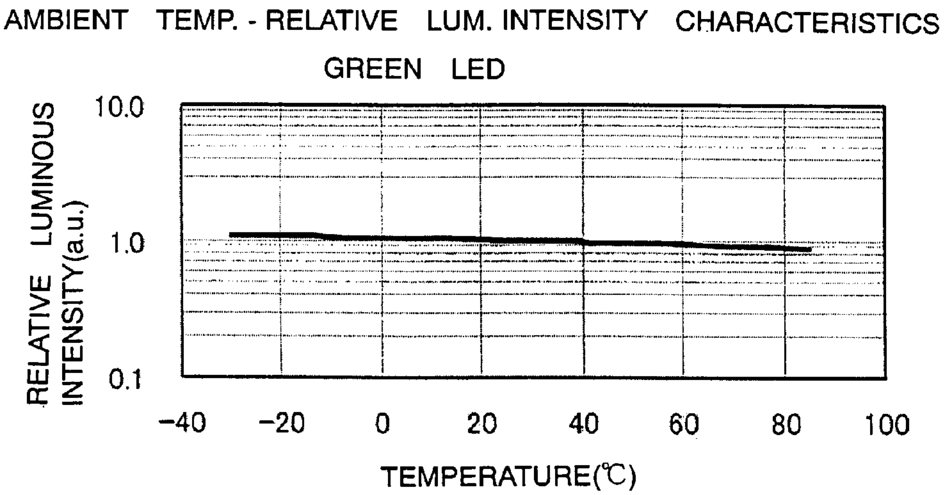
FIG. 8 is a graph showing temperature characteristics of a green light-emitting diode.

In addition, the lighting apparatus can also control the electric power supplied to the light-emitting diodes based on temperature. This lighting apparatus includes a temperature sensor for detecting the temperature of the light emitting diodes. The light emitting diodes vary the intensities of the light emissions depending on the temperature as a parameter, as shown in FIG. 6 to FIG. 8. In these figures, the horizontal axis indicates temperature, and the vertical axis indicates a relative value of intensity of the light emission of the light emitting diode. The control circuit predicts variation such as an increase and decrease of the amount of light emission of red, blue, and green light-emitting diodes caused by the increased temperature, and controls the electric power supplied to the red, blue, and green light-emitting diodes, for example the supplied currents, in response to the variation. Accordingly, it is possible to prevent color variation of the whole light emissions due to the temperature.

As compared with a light-emitting diode of GaN group commonly used for blue or green, generally, a light-emitting diode of AllnGaP group or the like commonly used for red has the characteristic that the efficiency of light emission sharply decreases as the temperature rises. Thus, when the temperature of the light-emitting diode rises, the emitted light shifts toward the direction between blue and green from the specified chromaticity coordinates. In order to correct this shift, when the temperature rises, the control circuit increases the current for the red light-emitting diodes so as to increase the amount of the light emission, or decreases the currents for the blue and green light-emitting diodes. Therefore the color of the whole light emissions can be constant. The lighting apparatus capable of this control directly controls the electric power supplied to the light-emitting diodes by detecting the temperature of the light-emitting diodes, or by measuring the temperature of the base, on which the light-emitting diodes are fixed, or controls the electric power supplied to the light-emitting diodes by measuring the optical characteristics of the emitted light.

The concave reflector 2 (22, 32, 42) reflects the light beams from the light-emitting diodes 1 (21, 31, 41) and focuses them to a narrower spot, or scatters the light beams from the light-emitting diodes 1 (21, 31, 41) so as to illuminate a wide range. The concave reflector 2 (22, 32, 42) reflects the light beams from the light-emitting diodes 1 (21, 31, 41) and focuses them as parallel light beams. In the lighting apparatuses shown in FIG. 1 and FIG. 2, the concave reflector 2 (22) is disposed so that its reflection surface serves as a reflection surface, and the light-emitting diodes 1 (21) are arranged so that the light beams are upwardly emitted from the lower side of the concave reflector 2 (22). In the lighting apparatuses shown in these figures, the focusing point of the light beams is positioned at a focal point of the concave reflector 2 (22) to focus the light beams to a narrow spot. The reflection surface of the concave reflector 2 (22) has a shape changing the light emitted toward the reflection surface from the focal point to the parallel light rays thereby focusing the light to a narrow area.

In the lighting apparatus of FIG. 1, the light beams from the light-emitting diodes 1 are directly focused to the focusing point. In the lighting apparatus of FIG. 2, a conical reflector horn 26 is provided between the light-emitting diodes 21 and the concave reflector 22, and the light beams from the light-emitting diodes 21 are focused to the focusing point by the conical reflector horn 26. An inner surface of the conical reflector horn 26 reflects the light emitted from the light-emitting diodes 21 and radiates the light from its tip portion so that the light is focused to the focusing point. The conical reflector horn 26 is a conical reflector with the inner surface serving as the reflection surface, or is molded in a conical shape from a transparent material such as a plastic, or glass, through which the light can pass. In the conical reflector horn 26 molded in a conical shape from a transparent material, its inner surface with a conical shape reflects the light beams from the light-emitting diodes 21 by total internal reflection. In other words, the direction of light beams and the refractive index of the transparent material are specified so that the inner surface with a conical shape reflects the light beams by total internal reflection.

In this lighting apparatus, since the light beams from the light-emitting diodes 21 are focused by the conical reflector horn 26, the light emitted from the light-emitting diodes 21 can be more efficiently focused to the focusing point. Accordingly, the light is efficiently focused from the concave reflector 22 to a narrow region, and is radiated.

Figure 3:
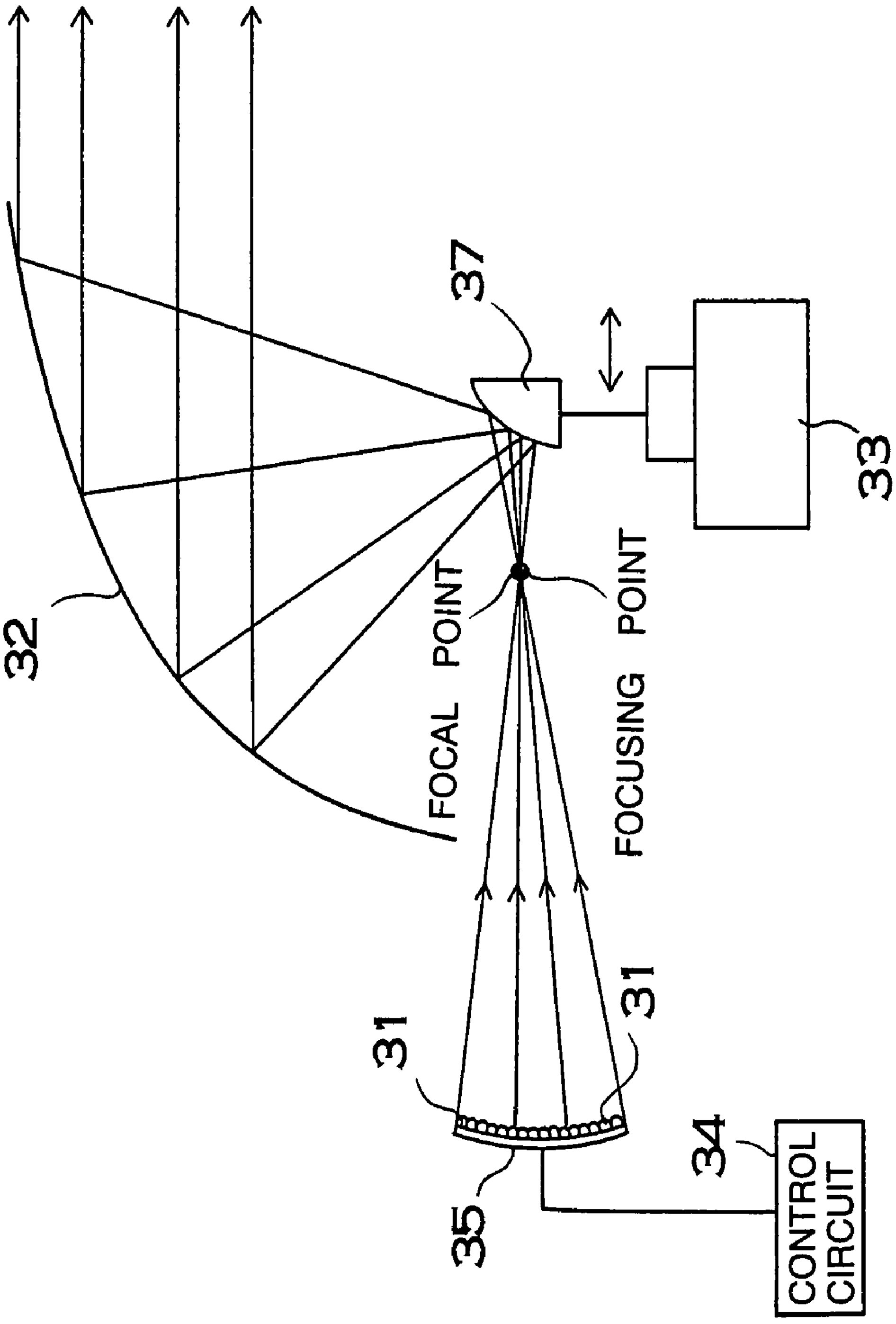
FIG. 3 is a view schematically showing the construction of a lighting apparatus according to another embodiment of the present invention.

In a lighting apparatus of FIG. 3, a convex reflector 37 is arranged adjacent to a focal point of a concave reflector 32. In this lighting apparatus, reflection surfaces of the convex reflector 37 and the concave reflector 32 have shapes capable of focusing the focused light beams to a narrow area by reflecting the light beams by the convex reflector 37 and the concave reflector 32, in other words, shapes capable of changing the light beams to parallel light rays by the concave reflector 32.

Figure 4:
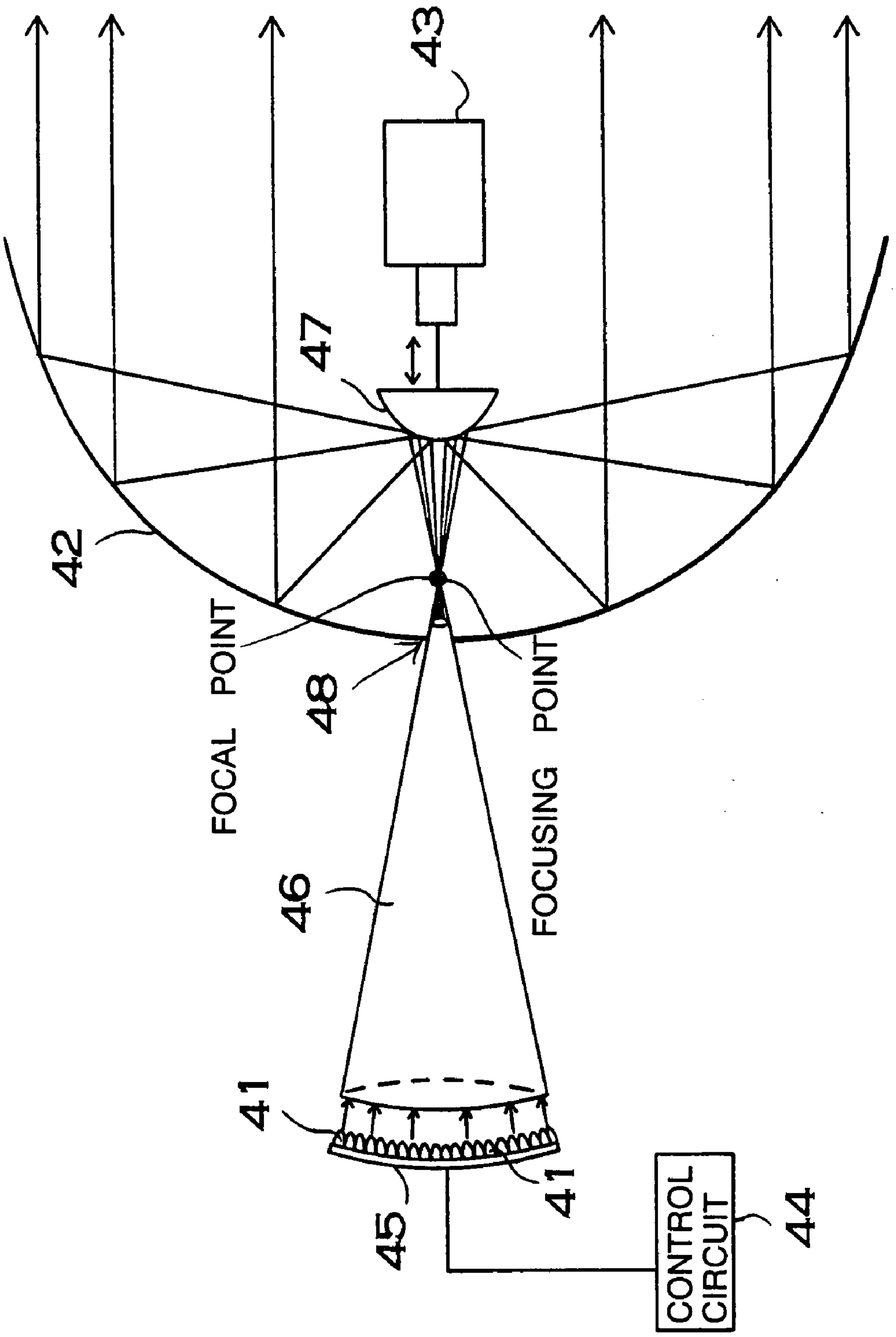
FIG. 4 is a view schematically showing the construction of a lighting apparatus according to another embodiment of the present invention.

In a lighting apparatus of FIG. 4, further, a convex reflector 47 is arranged at a position adjacent to a focal point of a concave reflector 42, and the focusing point is adjusted to agree with one focal point of the convex reflector 47, and another focal point of the convex reflector 47 is adjusted to agree with the focal point of the concave reflector 42. In order to irradiate the convex reflector 47 with the light beams, the concave reflector 42 has a center hole 48 opening therein. In this lighting apparatus, the light beams from the light-emitting diodes 41 pass through the center hole 48 in the concave reflector 42 so that the convex reflector 47 is irradiated with the light beams, and the concave reflector 42 reflects the light reflected by the convex reflector 47.

Figure 5:
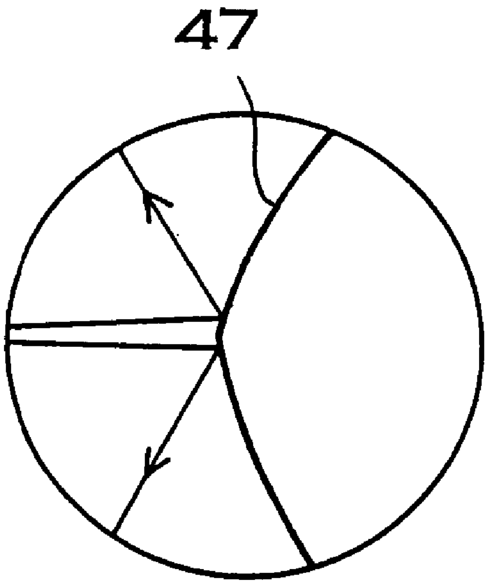
FIG. 5 is an enlarged sectional view showing a primary portion of the lighting apparatus shown in FIG. 4.

The convex reflector 47 scatters the light passing through the center hole 48 in the concave reflector 42 so as to radiate the light toward an inner surface of the concave reflector 42. The reflection surface of the convex reflector 47 is a spherical shape or a parabolic shape. If the light striking a center portion of the convex reflector 47 is forwardly reflected so as to change its direction to 180°, it cannot be reflected toward the concave reflector 42. As shown in an enlarged sectional view of FIG. 5, therefore, the center is sharpened so that the light beams striking the center are scattered around the periphery thereof. The convex reflector 47 can efficiently reflect the light beam passing through the center hole 48 toward the reflection surface of the concave reflector 42. In this lighting apparatus, a position-changing mechanism 43 adjusts the convex reflector 47, and the concave reflector 42 further reflects the light reflected by the convex reflector 47, thus, the light can be focused to a narrow area as parallel light rays. Additionally, the light can be radiated in a wide area by changing the position of the convex reflector 47.

In the lighting apparatus of FIG. 4, further, the light beams from the light-emitting diodes 41 are focused by a conical reflector horn 46 so that the light beams pass through the center hole 48 in the concave reflector 42. The conical reflector horn 46 can have the same construction as the lighting apparatus shown in FIG. 2. The lighting apparatus of this construction focuses the light beams from the light-emitting diodes 41 by using the conical reflector horn 46, and the light beams can efficiently pass through the center hole 48 of the concave reflector 42.

The position-changing mechanism 3 of FIG. 1 changes the position of the light-emitting diodes 1 relative to the concave reflector 2. When the focusing point of the light-emitting diodes 1 is brought to the focal point of the concave reflector 2 by the position-changing mechanism 3, the concave reflector 2 illuminates so that the light beams are focused as parallel light rays. When the position-changing mechanism 3 moves the position of the light-emitting diodes 1 relative to the concave reflector 2, the focusing point of the light-emitting diodes 1 is deviated from the focal point of the concave reflector 2. In this state, the light rays reflected by the concave reflector 2 are not parallel. The concave reflector 2 scatters and radiates the light. Accordingly, as the focusing point is deviated from the focal point of the concave reflector 2 by moving the light-emitting diodes 1 by the position-changing mechanism 3, the reflected light is scattered more widely. In the lighting apparatus of the figure, the base 5 of the light-emitting diodes 1 is moved by the position-changing mechanism 3 so as to move the focusing point of the light-emitting diodes 1 relative to the focal point of the concave reflector 2. In the lighting apparatus according to the present invention, though not illustrated, the concave reflector may be moved relative to the light-emitting diodes without moving the light-emitting diodes, or both the light-emitting diodes and the concave reflector may be moved.

In the lighting apparatus of FIG. 1, the position-changing mechanism 3 moves the light-emitting diodes 1 in the direction indicated by an arrow, however, the position-changing mechanism 3 may move the relative position of the focusing point of the light-emitting diodes 1 relative to the focal point of the concave reflector 2 in the up-and-down and right-and-left directions so as to focus or scatter the light beams. The light scattering condition can be varied by adjusting the direction of the focusing point and the focal point moving relative to each other.

In the lighting apparatus of FIG. 2, the position-changing mechanism 23 moves the concave reflector 22 so as to change a relative position of the focusing point of the light-emitting diodes 21 relative to the focal point of the concave reflector 22. In the lighting apparatus with this construction, it is necessary to move the focusing point of the light-emitting diodes 1 and the focal point of the concave reflector 2 relative to each other without changing a relative position of the light-emitting diodes 1 relative to the conical reflector horn 26. Accordingly, when the light-emitting diodes 21 move, the conical reflector horn 26 should also move together. In the lighting apparatus of FIG. 2, the concave reflector 22 moves, thus, the light-emitting diodes 21 and the conical reflector horn 26 can be fixed. The position-changing mechanism 23 moves the concave reflector 22 in the up-and-down and right-and-left directions indicated by arrows in the figure whereby the light rays reflected by the concave reflector 22 are parallel, or are scattered.

In the lighting apparatus of FIG. 3, the position of the convex reflector 37 is moved by the position-changing mechanism 33, the light rays reflected by the concave reflector 32 are focused as parallel light rays or are scattered. As the position of the convex reflector 37 is changed by the position-changing mechanism 33, the direction of light beams, with which the convex reflector 37 irradiates the concave reflector 32, changes, thus, the concave reflector 32 reflects the light rays as parallel light rays or as scattered light rays. The reflection surface of the concave reflector 32 is curved so as to reflect the light rays as parallel light rays when the convex reflector 37 is positioned at a particular position. In this lighting apparatus, the position-changing mechanism 33 moves only the convex reflector 37, thus, the relative position of the convex reflector 37 relative to the concave reflector 32, and the relative position of the light-emitting diodes 31 relative to the convex reflector 37 shift. In the lighting apparatus of this construction, however, the position-changing mechanism may move the position of the concave reflector so as to change the relative position of the convex reflector relative to the concave reflector, or may move only the position of the light-emitting diodes so as to change the relative position of the light-emitting diodes relative to the convex reflector, so that the light reflected by the concave reflector are focused as parallel light rays, or are scattered.

Figure 9:
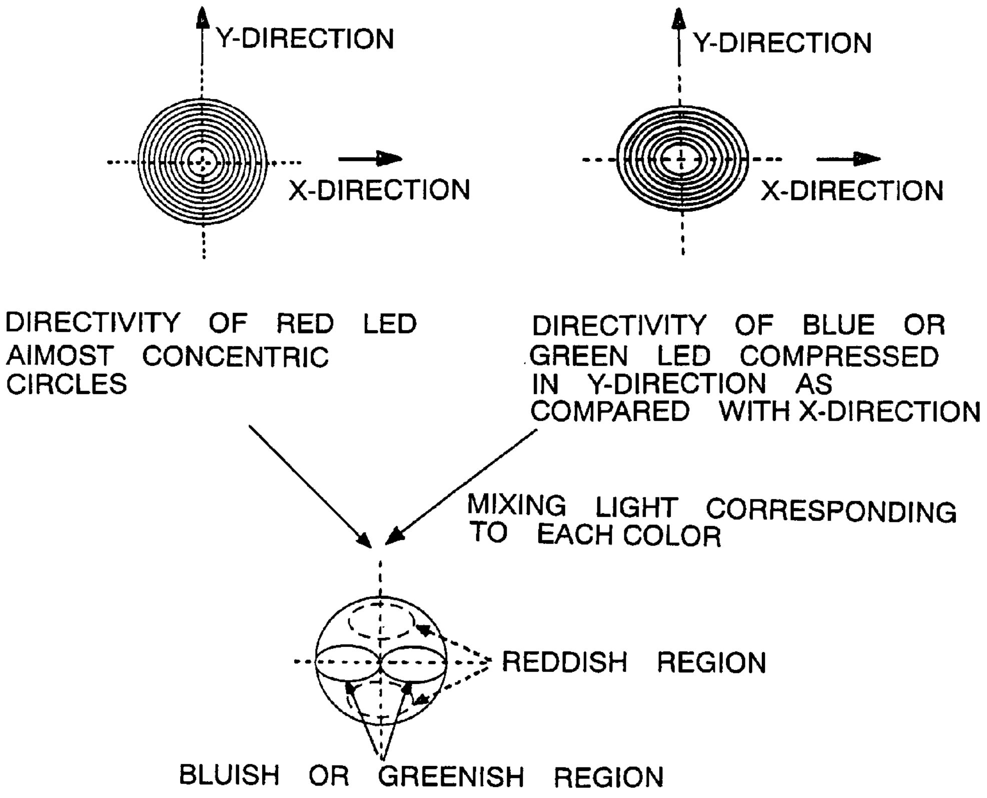
FIG. 9 shows a directivity of a blue or green light-emitting diode and a directivity of a red light-emitting diode.

In addition, generally, as compared with a red light-emitting diode, a blue or green light-emitting diode has a distribution of luminous intensity with a slight deviation in the immediate outside of the center of the optical axis even if they have the same half-value angle, due to the difference between their molding package structures. FIG. 9 shows this state. As shown in FIG. 9, while the red light-emitting diode has a concentric distribution, a blue or green light-emitting diode has a distribution with the x-axis where the luminous intensity is slightly higher and the y-axis where the luminous intensity is lower when the center of the optical axis is defined as the origin. Although such differences cannot be recognized by the human eye in the case of monochromatic light, the x-axis direction with bluish or greenish white as shown by a solid line and the y-axis direction with reddish white as shown by a dashed line appear separately when red, blue, and green are mixed. This causes color unevenness, which can be recognized by the human eye.

In the lighting apparatus according to the present invention, the colors of light can be mixed almost completely by deviating the focusing point of the light-emitting diodes from the focal point of the convex reflector or the concave reflector, or by using the conical reflect horn. In addition, the reflection surface of the convex reflector may be formed in a non-regular reflect surface, in which an entry angle is not equal to a reflection angle.

Conventionally, when the light-emitting diodes are mounted, the directions of their anodes and cathodes are changed by 90° so as to direct them in four directions, or a diffusion material or the like is included in a lens portion of a light-emitting diode, as a construction to cancel such color unevenness of the lighting apparatus. The construction using the diffusion material reduces the deviation of the luminous intensity of the light-emitting diodes, but has a disadvantage in that luminous intensity extremely decreases in the center.

In the lighting apparatus according to the present invention, a light-emitting diode with a light-emitting device formed by molding various semiconductors with resin, glass, or the like, or with a light-emitting device disposed in its package is used. It is preferable that this light-emitting diode has a lens focusing the emitted light to the center of the optical axis in its front side. A light-emitting device with a semiconductor of ZnS, ZnSe, SiC, GaP, GaAs, GaAlP, GaAlAs, AlInGaP, AlInGaAs, GaN, InN, AlN, GaAlN, InGaN, AlInGaN, and so on, as a light-emitting layer formed on or above a base body by a liquid-phase growth method or an MOCVD method is preferably used. MIS junction, PIN junction, and homo-structure, hetero-structure and double hetero structure, which have pn junction, can be used as the structure of the semiconductor. In addition, single-quantum-well structure, and multi-quantum-well structure with light-emitting layer(s), which is/are enough thin to result in quantum effect, can be used. The materials and the crystal mixture ratio of semiconductor can be variously selected to obtain wavelengths from the ultra-violet to the infrared region.

A molding member of a light-emitting diode is preferably provided so as to protect an LED chip from an external environment. In addition, the molding member including an organic or inorganic diffusion material can reduce the directivity of the light rays from the LED chip, and can increase a view angle. An inorganic material such as barium titanate, titanium oxide, aluminum oxide or silicon oxide, or an organic material such as melamine resin, CTU guanamine resin, or benzoguanamine resin can be preferably used as the diffusion material. Additionally, filter effect cutting unnecessary wavelengths can be obtained by including color dye, color pigment, or the like.

Furthermore, in order to achieve a full-color range by using LED chips, it is preferable that LED chips with a primary wavelength of 600–700 nm as red light emission, a primary wavelength of 495–565 nm as green light emission, and a primary wavelength of 400–490 nm as blue light emission are used.

A feature of a lighting apparatus according to the present invention is to vary both the color temperature and the intensity of the light emission very quickly and extensively. The reason is that a plurality of light-emitting diodes emitting red, blue, and green light are arranged so as to emit the light beams toward a focusing point, and a control circuit controls the intensity of light emission of each of the light-emitting diodes, and a concave reflector reflects and radiates the light beams so that the light beams are focused or scattered, in the lighting apparatus according to the present invention. A lighting apparatus according to the present invention uses not a halogen lamp or a xenon lamp, which are conventionally used, but a plurality of light-emitting diodes emitting red, blue, and green light as a light source. Accordingly, this lighting apparatus can radiate high power and the most suitable amount of light beams by selecting the number of the light-emitting diodes. In particular, controlling the light-emitting diodes emitting red, blue, and green light by the control circuit can vary the color temperature very quickly and extensively in addition to the intensity of the light emission. Furthermore, using light-emitting diodes as a light source can provide a feature of a long lifetime and simple maintenance and control.

In addition, a feature of a lighting apparatus according to the present invention is to maintain a specified chromaticity coordinates (color temperature). In a light-emitting diode, the efficiency of light emission varies depending on the temperature condition of a light-emitting device of a semiconductor. In red, blue, and green light-emitting diodes, the temperature conditions of the light-emitting devices vary depending on the variations of currents flowing therein respectively, and are additionally affected by the temperature conditions of other peripheral light-emitting diodes. Thus, even if certain specified constant currents are applied to the red, blue, and green light-emitting diodes respectively, when the temperature of the light-emitting diodes varies with the passage of time, the radiated light cannot be maintained at targeted chromaticity coordinates (color temperature). In the lighting apparatus according to the present invention, a temperature sensor, or a photo sensor is provided, and the control circuit performs fine adjustment of currents applied to the light-emitting diodes based on the measured data obtained by the sensor, thus, the lighting apparatus has a feature that can maintain the chromaticity coordinates (color temperature) specified once.

Moreover, a lighting apparatus according to the present invention has a feature that the illumination range can be focused to a very narrow spot or can be scattered over a wide range. The reason is that the position-changing mechanism changes a relative position of the focusing point of the plurality of the light-emitting diodes relative to a focal point of the concave reflector, or a convex reflector is disposed between the concave reflector and the light-emitting diodes, and the position-changing mechanism changes a relative position of the light-emitting diodes relative to the convex reflector, or a relative position of the convex reflector relative to the concave reflector, in the lighting apparatus according to the present invention. In these lighting apparatuses, the concave reflector can focus or scatter the light beams from the light-emitting diodes very easily by changing the relative position of the light-emitting diodes, the concave reflector, or the convex reflector. Therefore, ideal illumination can be obtained by controlling the illumination range in the optimal state according to its applications.

The invention claimed is:

1. A lighting apparatus comprising:

a plurality of light-emitting diodes for emitting red, blue, and green light, the plurality of light-emitting diodes being operable to emit light beams and being arranged so as to emit the light beams toward a single focusing point;

a control circuit for controlling the intensity of light emission of each of the light-emitting diodes emitting red, blue, and green light;

a concave reflector for reflecting and radiating the light focused from the light-emitting diodes to the focusing point so that the light is further focused or scattered; and a position-changing mechanism for changing a position of at least one of the concave reflector and the plurality of light-emitting diodes, wherein the light-emitting diodes are arranged so that the light beams emitted therefrom will be reflected by the concave reflector, wherein the position-changing mechanism is operable to adjust a focal point of the concave reflector relative to the focusing point of the plurality of the light-emitting diodes so that the light beams from the light-emitting diodes are focused or scattered by the concave reflector.

2. The lighting apparatus according to claim 1, wherein when the focusing point of the light-emitting diodes is positioned at the focal point of the concave reflector, the concave reflector reflects the light beams from the light-emitting diodes so as to focus the light beams.

3. The lighting apparatus according to claim 1, wherein the plurality of light-emitting diodes are arranged on a spherical base so that the light beams are focused to the focusing point.

4. The lighting apparatus according to claim 1, wherein the concave reflector is disposed so that its lower surface serves as a reflection surface, and the light-emitting diodes are arranged so as to upwardly emit the light beams toward the lower side of the concave reflector.

5. The lighting apparatus according to claim 1, wherein the control circuit controls the intensities of light emissions of the light-emitting diodes emitting red, blue, and green light so that color of the whole light emissions is varied.

6. The lighting apparatus according to claim 1, wherein the control circuit controls the intensities of light emissions of the light-emitting diodes emitting red, blue, and green light so that color temperature of light emission is varied.

7. The lighting apparatus according to claim 1, wherein a temperature sensor for directly or indirectly detecting temperature of the light-emitting diodes is connected to the control circuit, and the control circuit controls the intensities of light emissions of the light-emitting diodes emitting red, blue, and green light based on the temperature detected by the temperature sensor so as to achieve a specified chromaticity coordinates.

8. The lighting apparatus according to claim 1, wherein a photo sensor for directly or indirectly detecting light of wavelengths corresponding to red, blue, and green emitted from the light-emitting diodes is connected to the control circuit, and the control circuit controls the intensities of light emissions of the light-emitting diodes emitting red, blue, and green light based on a signal detected by the photo sensor so as to achieve a specified chromaticity coordinates.

9. The lighting apparatus according to claim 1, wherein the position-changing mechanism comprises a mechanism for changing the position of the light-emitting diodes.

10. The lighting apparatus according to claim 1, wherein the position changing mechanism comprises a mechanism for changing the position of the concave reflector.

11. A lighting apparatus comprising:

a plurality of light-emitting diodes for emitting red, blue, and green light, the plurality of light-emitting diodes being operable to emit light beams and being arranged so as to emit the light beams toward a focusing point;

a control circuit for controlling the intensity of light emission of each of the light-emitting diodes emitting red, blue, and green light;

a concave reflector for reflecting and radiating the light focused from the light-emitting diodes to the focusing point so that the light is further focused or scattered; and adjusting means for adjusting a focal point of the concave reflector relative to the focusing point of the light-emitting diodes, wherein the adjusting means is operable to adjust the focal point of the concave reflector relative to the focusing point of the plurality of the light-emitting diodes so that the light beams from the light-emitting diodes are focused or scattered by the concave reflector, wherein a convex reflector is disposed between the concave reflector and the light-emitting diodes, and the convex reflector reflects the light focused from the light-emitting diodes to the focusing point, and the concave reflector reflects and radiates the light from the light-emitting diodes reflected by the convex reflector, so that the light is focused or scattered.

12. The lighting apparatus according to claim 11, wherein the means for adjusting comprises a position-changing mechanism operable to change a relative position of the concave reflector relative to the convex reflector or a relative position of the light-emitting diodes relative to the convex reflector, so that the light beams from the light-emitting diodes are focused or scattered by changing the relative position of the convex reflector relative to the concave reflector or the relative position of the light-emitting diodes relative to the convex reflector by the position-changing mechanism.

13. The lighting apparatus according to claim 12, wherein a reflection surface of the convex reflector is a spherical shape or a parabolic shape.

14. The lighting apparatus according to claim 11, wherein the convex reflector is disposed adjacent to the focal point of the concave reflector, and the convex reflector reflects the light beams from the light-emitting diodes so that the concave reflector reflects the light beams.

15. The lighting apparatus according to claim 11, wherein the convex reflector is disposed adjacent to the focal point of the concave reflector, and the concave reflector has a center hole opening therein, and the light beams from the light-emitting diodes pass through the center hole in the concave reflector, and the convex reflector reflects light beams so that the concave reflector reflects the light beams.

16. The lighting apparatus according to claim 15, wherein a center portion of the convex reflector is sharpened so that the light beams striking the center portion are scattered around the periphery thereof.

17. The lighting apparatus according to claim 14, wherein a conical reflector horn, an inner surface of which reflects the light emitted from the light-emitting diodes so as to focus the light to its tip portion, is disposed between the light-emitting diodes and the convex reflector, and the conical reflector horn focuses the light emitted from the plurality of light-emitting diodes so that the convex reflector reflects the light.

18. A lighting apparatus comprising:

a plurality of light-emitting diodes for emitting red, blue, and green light, the plurality of light-emitting diodes being operable to emit light beams and being arranged so as to emit the light beams toward a focusing point;

a control circuit for controlling the intensity of light emission of each of the light-emitting diodes emitting red, blue, and green light;

a concave reflector for reflecting and radiating the light focused from the light-emitting diodes to the focusing point so that the light is further focused or scattered; and adjusting means for adjusting a focal point of the concave reflector relative to the focusing point of the light-emitting diodes, wherein the adjusting means is operable to adjust the focal point of the concave reflector relative to the focusing point of the plurality of the light-emitting diodes so that the light beams from the light-emitting diodes are focused or scattered by the concave reflector, wherein a conical reflector horn, an inner surface of which reflects the light emitted from the light-emitting diodes so as to focus the light to its tip portion, is disposed between the light-emitting diodes and the concave reflector, and the conical reflector horn focuses the light emitted from the plurality of light-emitting diodes to the focusing point.

19. The lighting apparatus according to claim 18, wherein the conical reflector horn is a conical reflector with its inner surface serving as a reflection surface.

20. The lighting apparatus according to claim 18, wherein the conical reflector horn is molded in a conical shape from a transparent material, through which the light can pass.

* * * * *